Nov. 21, 1944.    N. L. FULLER    2,363,173
INSTRUMENT FOR COMPUTING FIRING DATA
Filed Nov. 4, 1942    3 Sheets-Sheet 2

Inventor
Norbert L. Fuller
By Munn, Liddy & Glaccum
Attorneys

Patented Nov. 21, 1944

2,363,173

UNITED STATES PATENT OFFICE 2,363,173

INSTRUMENT FOR COMPUTING FIRING DATA

Norbert L. Fuller, Tampa, Fla.

Application November 4, 1942, Serial No. 464,510

4 Claims. (Cl. 33—75)

This invention relates to an instrument for computing firing data of ordnance.

An object of the invention is the provision of an instrument for aiding in quickly determining the firing angle of a gun by means of a fixed protractor divided into mils, a rotatable protractor having a sliding pivot on an arm which is adapted to be alined with a mil designation that represents an angle formed by a line extending from the gun to the observation point and a line extending from the opposite observation post to the target with the apex of the angle being located at the center of the fixed protractor representing the observation post, a second pointer being pivoted at the center of the fixed protractor and adapted to be moved to a position to represent the measured angle, that is the angle formed by a line extending from the aiming point to the observation post and a line extending from the observation post to the target, a third arm being pivoted on the movable pivot of the rotatable protractor so that said arm will normally form an angle with the central longitudinal lines on said arms intersecting at various points to represent the yards between the aiming point and the observation post, the second mentioned arm being provided with numerals from 1 to 10 representing the thousands of yards, the distance between the gun and the observation post being set on the instrument by varying the pivot of the rotatable protractor with relation to the center of the fixed protractor, a line placed on the fixed protractor and extending from the center to the periphery and cutting the periphery at a common point for the 6,400 mils or 0 mils, the rotatable protractor having an arm which is provided with a line adapted to intersect the line on the fixed protractor at a point numbered according to the number of thousands of yards that the target is from the observation post.

Another object of the invention is the provision of an instrument for determining the firing angle of a gun without the use of logarithms, so that complicated computations will thus be eliminated and whereby the necessary firing angle can be obtained in approximately fifteen seconds, and this being regardless of whether a panoramic or French sight are employed to obtain the initial firing data.

A further object of the invention is the provision of an instrument for determining the firing angle of a gun, or the firing angles of a plurality of guns that are spaced at definite intervals by a simple and efficient method in a considerably shorter period of time than has been possible where it has been necessary to obtain the results by mathematical computation.

This invention will be best understood from a consideration of the following detailed description, in view of the accompanying drawings forming a part of the specification; nevertheless, it is to be understood that the invention is not confined to the disclosure, being susceptible of such changes and modifications as define no material departure from the salient features of the invention as expressed in the appended claims.

Figure 1:
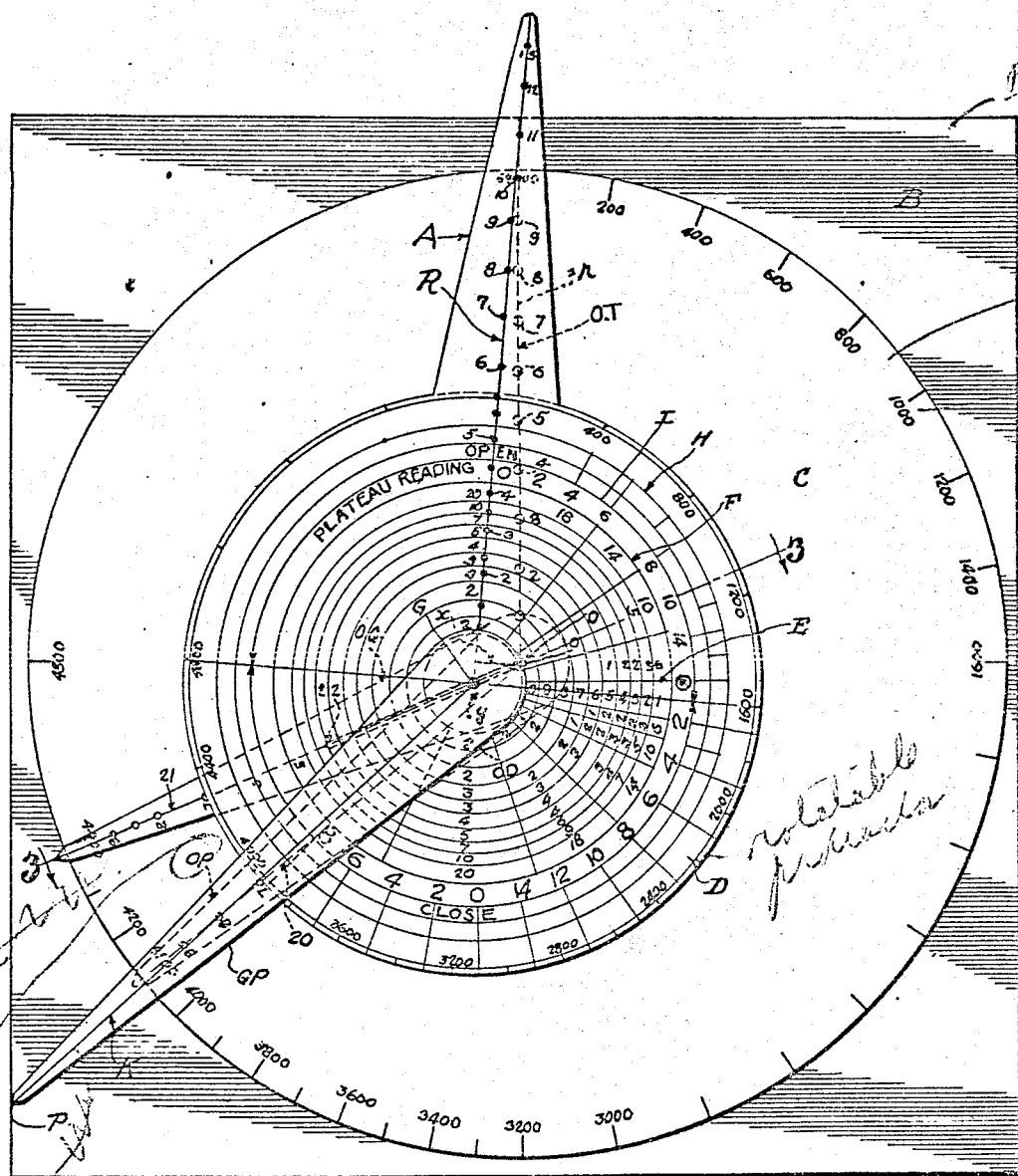
Figure 1 is a plan view of the instrument with the parts in operative relation to determine the firing angle of a gun after certain data has been obtained.
Figure 2:
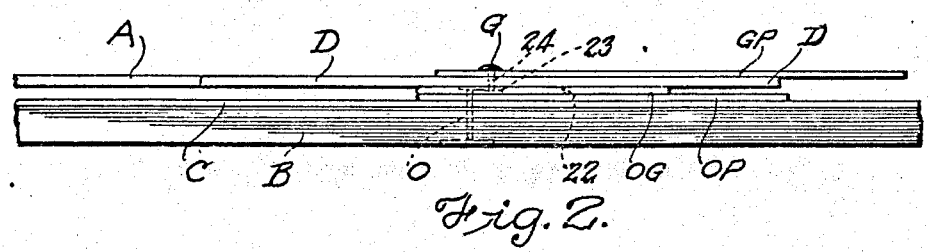
Figure 2 is a fragmentary end view of the instrument.
Figure 3:
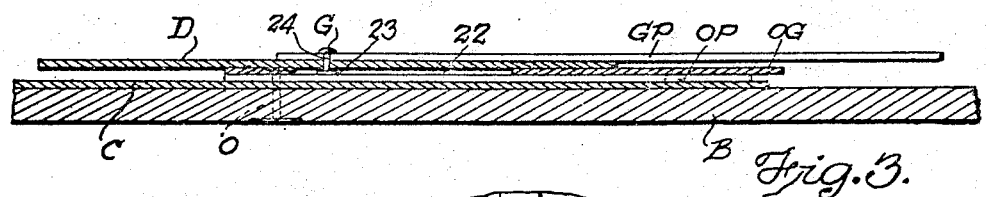
Figure 3 is a section taken along the line 3—3 of Fig. 1.
Figure 4:
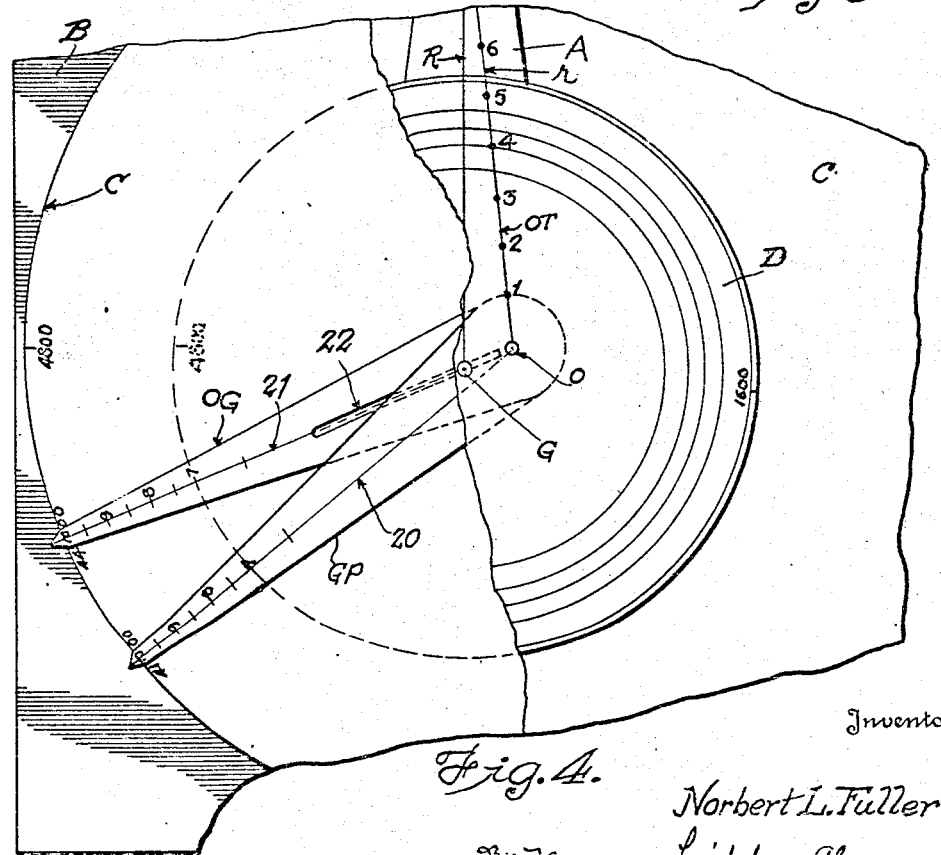
Figure 4 is a fragmentary plan view of the instrument with parts broken away.

Before it is possible to use the instrument certain data must be obtained such as the measured angle formed by lines extending from the aiming point to the observation point and from the observation point to the target, the angle formed by lines extending from the gun position to the observation post and from the observation post to the target, the distance from the observation post to the target in 1,000 yards, the distance between the aiming point and the observation post in 1,000 yards, and the distance between the observation post and the gun. With this data on hand the firing angle may be readily obtained by the proper manipulation of the various elements of the instrument.

The instrument consists of a base member B which may be formed of ply-wood, metal or composition material, and should be sufficiently rigid to prevent warping so that a fixed protractor C when secured to the upper surface of the base member may be maintained in a flat condition at all times.

It will be noted that the fixed protractor C is provided with numbers from 0 to 6,400 inclusive and each small division represents one mil, with larger divisions for the numerals 200, 400, etc. so that the large divisions represent each 200 mils. It will be further noted that the numeral 3200 is diametrically opposite 6,400 or zero, while the numerals 1,600 and 4,800 are diametrically opposite and are at the ends of a line which is at right angles to the line joining the divisions indicated by the numerals 3,200 and 6,400. The center of the fixed protractor is designated by the numeral 0 and this center represents the observation post.

A line OT connects the center O with the division indicated by the numeral 6,400. This radial line is divided into ten equal parts and the numerals 1 to 10 inclusive are applied to the divisions of the line.

An arm OP is pivoted at O on the fixed protractor C. It will be noted that this arm lies in flat contact with the outer face of the fixed protractor C and has its free end cutting across the divisions on said fixed protractor. The arm is provided with a longitudinal central line 20 which is divided into ten equal parts with the numerals 1 to 10 being applied to the divisions. On this line are found the numerical distances in 1,000 yards from the aiming point to the observation point.

A second arm designated as OG is pivoted at O and is located over the arm OP. This arm is also provided with a longitudinal central line designated 21, and this line is divided into ten equal divisions with the tenth division terminating at the periphery of the fixed protractor C. The arm is provided with a longitudinal slot 22. This slot extends for a portion of the length of the arm and is coincident with the line 21 for a purpose which will be presently explained. A rotatable protractor D is pivoted at G. This pivot as shown, is so constructed that it has a base portion 23 which is wide enough to span the slot 22 through which a post 24 extends. An arm GP is also pivoted on the post 24 in flat contact with the outer face of the rotatable protractor D and a head on the post maintains the arm GP in position on the protractor D. It will be seen from this construction that the protractor D will not only be rotated on the post 24 but since the post is fixed to the protractor D the post and the pivot may be moved along the slot 22 in the arm OG, in order to represent the varying distances between the gun and the observation post. Furthermore, the arm A together with the rotary protractor D are moved or shifted when the arm OG is moved so that any displacement of the arm OG will tend to displace the protractor D and likewise the arm A. Since the protractor is located eccentrically with respect to the fixed protractor C and carried by the sliding pivot G angular adjustment of the arm OG will cause a compensating adjustment of the protractor. In other words, movements of the arm OG on its pivot O will raise or lower the protractor D. These changes, as will be explained, have a direct bearing on the method of computing firing angle.

Referring more particularly to the rotary protractor D it will be seen that the upper half of said protractor is marked with the word "Open" while the lower half is marked "Close." On the radial line separating the open section from the closed section are radial lines provided with numerals 1 to 10 as shown at E. These numbers correspond to the aiming point range and ten concentric circles having the center at G divide the space enclosed within the circle F into ten equal parts with the numbers 1 to 10 inclusive located along a radial line and in the spaces.

Attention is called to the graduations located within the concentric circles H and I. The graduations are employed when firing guns equipped with the French collimator sight. The line K on the arm GP when properly positioned according to the data obtained initially will intersect the graduations between the circles I and H to indicate "Plateau" and "Drum."

The arm OG, as has been previously stated, has an elongated slot 22 in which the pivot G of the rotary protractor D is mounted and since the arm GP is also mounted on this pivot said arm is likewise moved back and forth. In a typical example to be given the distance between the gun and the observation post is 1,000 yards and therefore the pivot is moved outwardly to the graduation shown on the line OT of the fixed protractor C. The movable pivot G of the slot 22 is an important feature of the present invention.

Figure 5:
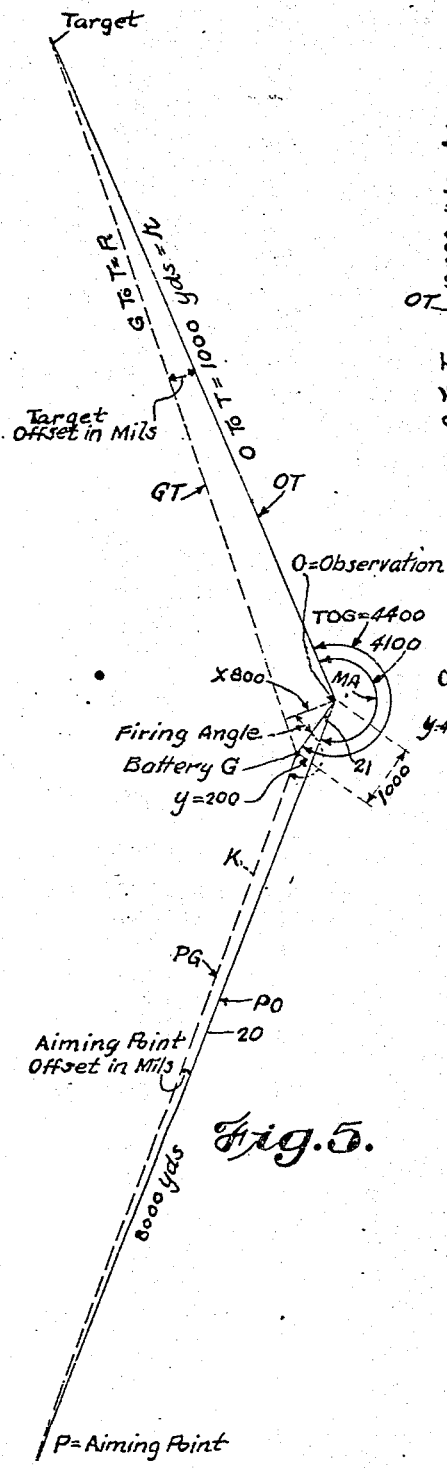
Figure 5 shows more or less diagrammatically the various positions of the elements of the instrument and illustrating a method of calculating the firing angle.

The problem to be solved is readily apparent once the center of the movable protractor is shifted the correct distance away from the observation post to indicate the distance between the gun and the observation post. The angle TOG (Fig. 5) is known in advance, and since it represents 4,400 mils the arm OG is moved so that the line 21 will fall on the graduation 4,400 on the fixed protractor C. The arm A is moved so that the line R will fall on the graduation marked 10 on the line OT. Thus it will be seen that the line OT on the fixed protractor C and the line 21 on the movable arm OG properly displays the angle TOG on the instrument reading clockwise from the target. The arm OP is moved so that the line 20 will fall on the indication 4,100 on the fixed protractor, and this line coincides with the line drawn from the aiming point to the observation post as shown in Fig. 5. The arm GP is then moved so that its central line K will cut across the graduation marked 8 on the arm OP.

The measured angle MA is 4,100 mils and the line 20 represents the distance between the aiming point and the observation post so that the angle MA is measured between the lines OT and PO or 20 with the observation post O as the apex of the angle, in other words, when the line K of the arm GP intersects the line 20 on the arm OP as at 8, the known range of 8,000 yards is thereby indicated on the instrument.

The firing angle shown on Fig. 5 is the angle formed by the line $x$ and the line 21 with the apex being at O, the observation post. The line $x$ is drawn perpendicular to the line GT while the line $y$ is drawn perpendicular to the line PO from the gun position or movable pivot G. An inspection of Fig. 1 will show that the line K intersects the movable protractor at approximately 3,995, which is the firing angle in mils, and is the angle to be used with guns equipped with panoramic sight.

With the instrument set in the position explained above, and as disclosed in Fig. 1, a plateau reading is obtained from the circle indicated by the letter H. The drum reading is obtained from the perimeter of the movable protractor. In the following problem the correct reading is plateau 8, drum 95, and is the firing angle in mils for guns equipped with the French sight.

Referring to Fig. 5 it will be seen that an example is set forth in which certain initially computed data is given, whereby the various elements of the instrument may be set to obtain readily the firing angle (FA) of the guns. The lines in the diagram in Fig. 5 are in accordance with the positions of the central longitudinal lines on the arms of the instrument.

The given data is as follows:
MA=4100 mils—position of the line 20 on arm OP.
E=10,000 yds. on OT line of fixed protractor C.
TOG=4400 mils, indicated by line 21 on arm OG.
OG=1000 yds. In order to obtain this distance on the instrument the pivot G or given position is moved outwardly from O, the observation post, one calibration as shown on line OT of the protractor C.

The line PO=8000 yds. and is fixed on the instrument by moving the arm GP on its pivot G until the line K cuts the line 20 at a point where the numeral 8 is found as shown in Fig. 1.

With the above given data the firing angle, the drum and plateau can be readily obtained. The line $x$ (Figs. 1 and 5) from the observation post O to the line GT and perpendicular thereto is computed as 800 yds. The line $y$ from the gun G to the line PO and perpendicular thereto is computed as 200 yds.

Therefore the solution is as follows:
Target offset is $$-\frac{800}{10} = -80 \text{ mils}$$

where 10 represents the number of thousand-yards from the observation post O to the target.
Aiming point offset is $$-\frac{200}{8} = -25 \text{ mils}$$

when 8 represents the number of thousand-yards from the observation post to the aiming point.
FA=4100−105=3995 mils for the panoramic sight.
The plateau and drum for the French sight, are found as follows:
FA=3995+100−3200=895
895=Plateau 8, Drum 95

It is to be borne in mind that FA=MA plus the algebraic sum of the offsets, −80 and −25 or −125.

Figure 6:
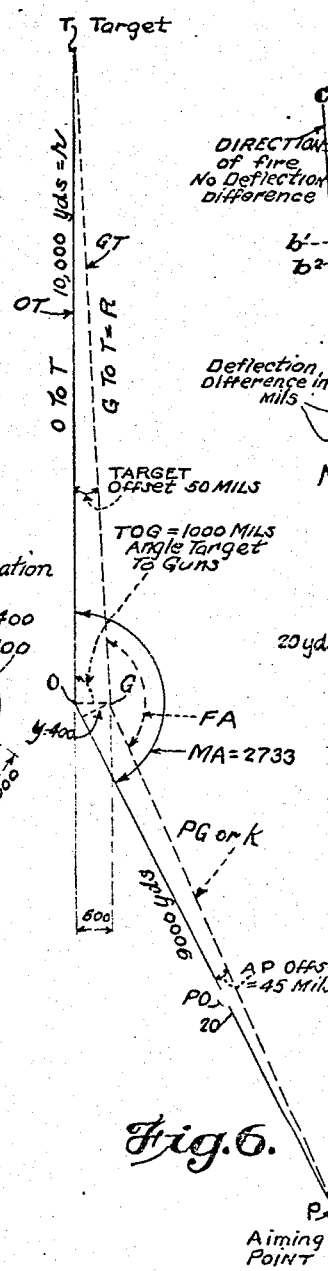
Figure 6 is a diagram illustrating another method of determining the firing angle with different data from that shown in Fig. 5.

In the problem to be solved in Fig. 6 the following data is given:
The measured angle MA=2733 mils; the TOG angle=1600, the distance between O and T=10,000 yds., the distance between P and O=9000 yds., $y$ computed as 400 yds. and the distance between O and G=500 yds.

The target offset $= \frac{500}{10} = +50$ mils.

Aiming point offset $= \frac{450}{9} = +45$ mils.

FA=MA+the sum of the offsets.
FA=2733+50+45=2828 mils for the Panoramic sight.
For the French sight the solution follows:
FA=2828+100−1600=1328
Plateau=12 Drum 128

The setting of the various elements of the instrument for a determination of the above problem will be accomplished by arranging the elements in accordance with the data obtained in the usual manner. The pivot G is moved half way between O and the first graduation one on the scale OT of the fixed protractor C to represent 500 yards, the distance between the gun base and the observation post. The arm A is then rotated until the line R cuts the graduation 6400 on the fixed protractor C or where the numeral ten (10) is found on the line OT. The arm OG is revolved until the line 21 cuts the graduation 1600 of the fixed protractor where the angle TOG=1600.

The line 20 of the arm OP must be alined with the graduation 2733 on the fixed protractor C. The arm GP is then moved so that the line K will cut the graduation numbered 9 on the arm OP.

The firing angle reading 2828 mils may be taken from the graduations at the periphery of the rotary protractor D where the line K of the arm GP cuts such graduations of the protractor D.

The nearest even number in the circle H of the protractor which is cut by the line K of the arm GP is 12 so that such reading gives the plateau as 12 while the drum will be 128 or 1328−1200 for the French sight.

The French system of sighting is based on the 6400 mil circle. This system calls for the division of the circle into four equal parts or quadrants of 1600 mils each. Each of these quadrants are further divided into Plateau divisions of 200 mils each. Thus the Plateau is read 0-2-3-4-6-8-10-12-14-0. The Drum reading further refines the setting by indicating the nearest mil. The Drum is divided into 200 equal parts.

The setting for the gun when shooting straight ahead is Plateau 0, Drum 100. This setting allows a reasonably large shift to be made either right or left without changing the Plateau setting.

When a solution is obtained by the usual method, 100 mils must be added to the FA. Then 1600 mils or multiples of 1600 mils must be subtracted from this sum to obtain an angle from which another subtraction of 200 mils or multiples of 200 mils must be made in order to reduce or convert to the Plateau and Drum reading.

This setting is read directly on circle H of the instrument. The instrument is of equal utility and accuracy when used with either French or Panoramic sights.

Figure 7:
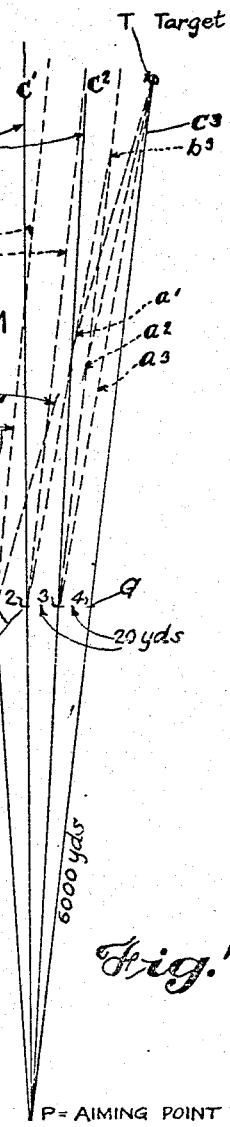
Figure 7 is a diagram showing the application of the device for determining the firing angles of a plurality of guns spaced a predetermined distance apart.

Fig. 7 shows diagrammatically the method of determining the angle required for a plurality of guns spaced a predetermined distance apart for either a parallel fire or a converged line of fire wherein the guns are spaced 20 yards apart and the target is located 6000 yards from the aiming point.

The solution follows: The intervals in yards between the guns is divided by the number of thousand yards; i. e., $$\frac{20}{6} \text{ yds.}$$

gives the mils for the required angle.

The solid lines $c$, $c'$, $c^2$ and $c^3$ form definite angles with each other and show the direction of fire if no deflection difference is considered.

The dot and dash lines $a'$, $a^2$ and $a^3$ show the guns converged on the target T while the dotted lines $b'$, $b^2$ and $b^3$ show parallel fire.

The deflection difference is the angle in mils formed by the solid line and the dotted line as indicated in Fig. 7 at M and N. The angle is computed for each gun.

In order to obtain a parallel or converged sheaf, guns 1 to 3 must "close" on gun 4. However, if aiming were in front, guns 1, 2 and 3 must "open" on gun 4. For the parallel sheaf on gun 4 "close" 3 mils.

The instrument illustrated in the figures must of necessity be shown relatively small but for practical purposes the same is much larger because the larger sizes will give a greater degree of accuracy.

I claim:

1. An instrument for computing data for the firing of guns comprising a fixed protractor of large diameter having mil-calibrations thereon with the center thereof representing the observation post, a movable protractor on the fixed protractor and mounted on a pivot representing the gun position and eccentric with respect to the center of the fixed protractor, means slidably mounting the pivot along a radial line of the fixed protractor, said movable protractor being movable entirely within the confines of said fixed protractor circumference, a line connecting the pivot with the center of the fixed protractor and a line graduated in thousand-yards and connecting the center of the fixed protractor with the zero mil-calibration forming a predetermined angle, an arm pivoted at the center of the fixed protractor having a line graduated in thousand-yards adapted to aline with a mil-calibration corresponding to the known angle formed by lines connecting the aiming point and target with the observation post, a second arm mounted on the pivot of the movable protractor and having a line adapted to intersect the line on the first arm at a point thereon corresponding to the range in yards from the aiming point to the observation post, said movable protractor having a radial extension movable over the line on the fixed protractor and provided with a longitudinal line adapted to intersect the line on said fixed protractor at a point corresponding to the range in thousand-yards from the observation post to the target.

2. An instrument for computing data for the firing of guns comprising a fixed protractor of large diameter having mil-calibrations thereon with the center thereof representing the observation post, a movable protractor of small diameter on the fixed protractor and mounted on a pivot representing the gun position and eccentric with respect to the center of the fixed protractor, means slidably mounting the pivot along a radial line of the fixed protractor, said movable protractor being movable entirely within the confines of said fixed protractor circumference, a line connecting the pivot with the center of the fixed protractor and a line graduated in thousand-yards and connecting the center of the fixed protractor with the zero mil-calibration forming a predetermined angle, an arm pivoted at the center of the fixed protractor having a line graduated in thousand-yards adapted to aline with a mil-calibration corresponding to the known angle formed by lines connecting the aiming point and target with the observation post, a second arm mounted on the pivot of the movable protractor and having a line adapted to intersect the line on the first arm at a point thereon corresponding to the range in yards from the aiming point to the observation post, said movable protractor having a line adapted to intersect the line on the fixed protractor at a point thereon corresponding to the range in yards from the observation post to the target, the movable protractor having mil-calibrations at its periphery which is cut by the line on the second arm to give the firing angle, said line on protractor extending radially from the simulated gun position.

3. An instrument for computing data for the firing of guns comprising a fixed protractor of large diameter, having mil-calibrations thereon, an arm pivoted at the center of the protractor and having a longitudinal line graduated in yards and intersecting the mil-calibrations, the arm having a slot extending along the line, a rotary protractor of smaller diameter and movable relative to the fixed protractor and entirely within the confines of the circumference of said fixed protractor, means slidably mounted in the slot and affording a central pivot for the rotary protractor, the pivot representing a gun base while the center of the fixed protractor representing the observation post, the fixed protractor having a radial line running from the center to the zero calibration and calibrated to represent in thousand yards the range from the observation post to the target, the rotary protractor having a radial line adapted to intersect the line on the fixed protractor at a point which represents the position of the target, a second arm pivoted at the center of the fixed protractor having a longitudinal line calibrated in yards representing the range from the observation post to the aiming point, a third arm pivoted on the sliding means and provided with a longitudinal line adapted to intersect the line on the second arm at the selected aiming point, the rotary protractor having mil-calibrations thereon, the line when the third arm is properly positioned falling on a mil-calibration of the rotary protractor for disclosing the firing angle of the gun, the arms and rotary protractor being formed of transparent materials.

4. An instrument for computing data for the firing of guns comprising a fixed protractor of large diameter, having mil-calibrations thereon, an arm pivoted at the center of the protractor and having a longitudinal line graduated in yards and intersecting the mil-calibrations, the arm having a slot extending along the line, a rotary protractor, of smaller diameter and movable relative to the fixed protractor and entirely within the confines of the circumference of said fixed protractor, means slidably mounted in the slot and affording a central pivot for the rotary protractor, the pivot representing a gun base while the center of the fixed protractor representing the observation post, the fixed protractor having a radial line running from the center to the zero calibration and calibrated to represent in thousand yards, the range from the observation post to the target, the rotary protractor having a radial line adapted to intersect the line on the fixed protractor at a point which represents the position of target, a second arm pivoted at the center of the fixed protractor having a longitudinal line calibrated in yards representing the range from the observation post to the aiming point, a third arm pivoted on the sliding means and provided with a longitudinal line adapted to intersect the line on the second arm at the selected aiming point, the rotary protractor having mil-calibrations thereon, the line when the third arm is properly positioned falling on a mil-calibration of the rotary protractor for disclosing the firing angle of the gun, the second-mentioned arm and the rotary protractor being formed of transparent materials.

NORBERT L. FULLER.